United States Patent Office 3,149,325
Patented Sept. 15, 1964

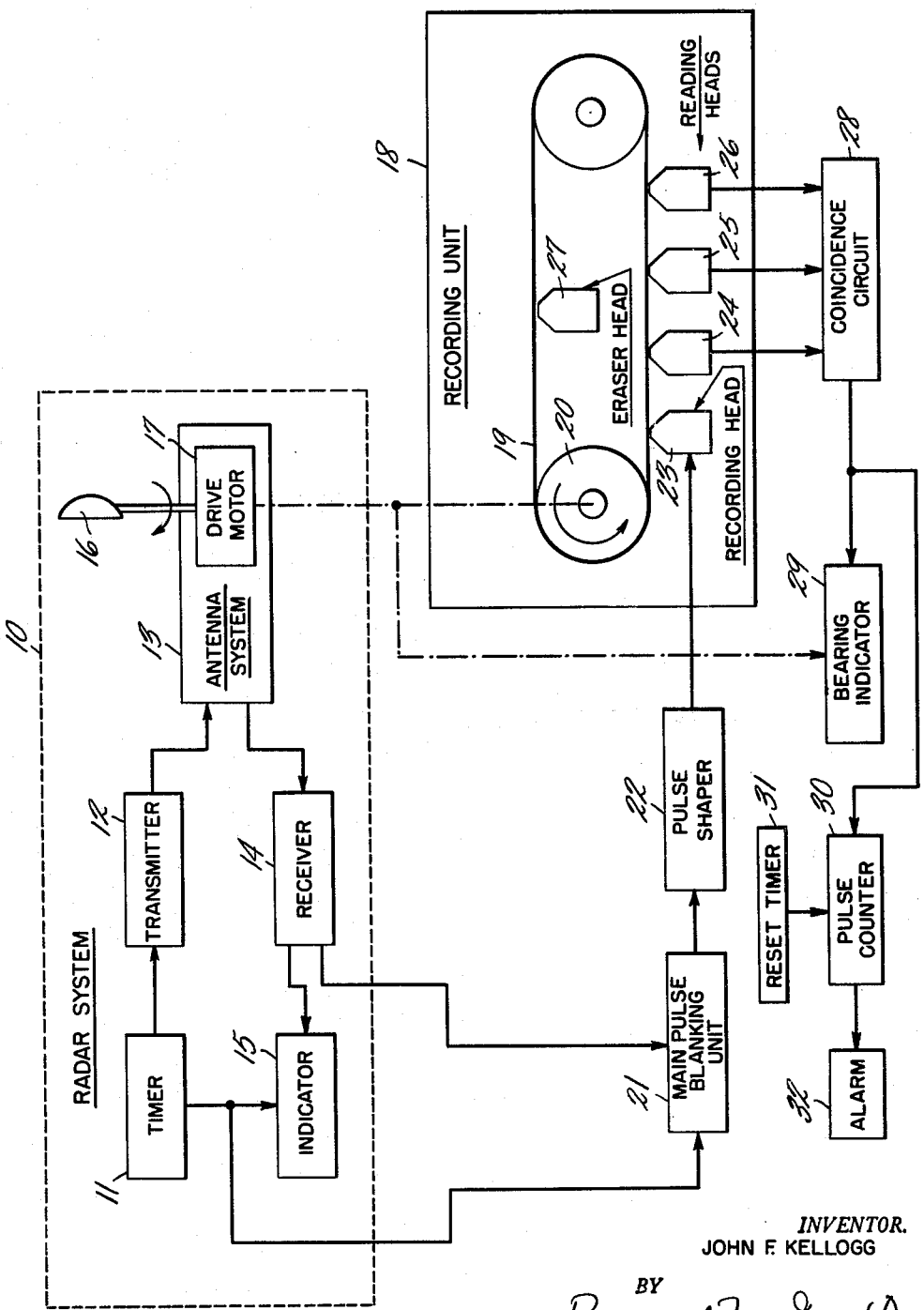

3,149,325
COLLISION WARNING SYSTEM
John F. Kellogg, Bethesda, Md., assignor to Vitro Corporation of America, New York, N.Y.
Filed May 8, 1959, Ser. No. 811,973
10 Claims. (Cl. 343—5)

This invention relates to systems for signalling the impending collision of a ship with another object and, more particularly, to a new and improved collision warning system for ships adapted for use in conjunction with any conventional radar system.

Radar systems of the type utilized on most ships are arranged to present repetitive representations of the objects surrounding the ship on a cathode ray screen at selected time intervals. These systems require constant surveillance by an observer who must be trained to interpret the representations properly. However, because of the strain of constant observation, the radar screen on a ship is frequently observed with reduced vigilance or left entirely unattended when the ship is not in a crowded area, such as a harbor.

Accordingly, it is an object of this invention to provide a warning system for a ship arranged to signal an impending collision with another object automatically.

Another object of the invention is to provide a warning system of the above character which is operable from any conventional shipboard radar unit to signal whenever the ship is on a collision course with another object.

A further object of the invention is to provide a warning system of the above character adapted to indicate the bearing of the other object.

These and other objects of the invention are attained by recording reflected radar pulses on a record medium moving at a rate of speed proportional to the rotational speed of the radar antenna and detecting pulses recorded on the record medium at at least two points spaced by a distance corresponding to one rotation of the antenna. When pulses have been detected simultaneously at both points a predetermined number of times, an alarm signal is actuated to indicate the existence of a collision course. In one embodiment of the invention, three spaced transducers are utilized to detect pulses recorded on the record medium and simultaneous signals from these transducers actuate a coincidence circuit. A counter responding to pulses from this circuit is arranged to actuate an alarm whenever a selected number of pulses have been received. In addition, a timer is arranged to reset the counter whenever no pulse signal has been received from the coincidence circuit within a predetermined time interval. Also, a bearing indicator synchronized with the rotation of the antenna responds to each signal from the coincidence to indicate the angular orientation of the antenna at the time the reflected pulses were received.

Further objects and advantages of the invention will be apparent from a reading of the following description in conjunction with the accompanying drawing which is a schematic block diagram representing the arrangement of a typical collision warning system according to the invention.

A consideration of the paths of two objects moving in straight lines so as to reach the same point at the same time will show that the angles between the paths of the objects and a line joining the objects must remain constant. This is true regardless of the relative speeds and directions of the two objects as long as these characteristics remain constant. Conversely, the angle between the path of one object and a line joining the object with another object will vary if the two objects are moving so as to reach the point of intersection of their paths at different times.

In accordance with this principle, the present invention indicates the existence of a collision course by determining the constancy of the angle between a ship's bearing and every other nearby object. To this end, a conventional search radar system 10 of the type utilized in most seagoing vessels and adapted to transmit microwave pulse signals and detect reflected signals is employed. This system may, for example, be of the general type described in the United States War Department Technical Manual TM 11–467, entitled "Radar System Fundamentals," published April 28, 1944.

As described in that publication, the radar system comprises a timer 11 which supplies synchronizing signals at a predetermined frequency, for example, 500 times per second, a transmitter 12 adapted to generate a microwave pulse having a short duration, such as 2 microseconds, in response to each synchronizing signal, and an antenna system 13 arranged to radiate the microwave pulse energy from the transmitter in a directional beam and detect pulse signals reflected from objects within range of the system. Also, a receiver 14 amplifies the reflected or return signals and reproduces them in a form suitable for presentation on a visual indicator 15 which may, for example, be a cathode ray tube arranged as a conventional plan position indicator.

In accordance with the usual practice, the antenna system 13 includes an antenna 16, which is arranged to transmit the microwave pulses in a substantially horizontal direction, and a drive motor 17 adapted to rotate the antenna at a constant rate of one revolution every two seconds, for example, the scan of the indicator 15 being coordinated with this motion in the usual manner. If a reflected pulse is received at the same angular position of the antenna during each sweep for a number of rotations of the antenna while the ship is moving, it is apparent from the relationship pointed out above that the ship is on a collision course with another object.

To detect this condition automatically, the warning system of the invention utilizes a recording unit 18 having an endless loop of magnetic tape 19. In certain instances, it may be desirable to kep a permanent record of the operation of the system and, in this event, the tape may be supplied from one spool and taken up on another spool instead of being in the form of an endless loop. In either case, the magnetic tape is driven at a rate proportional to the speed of rotation of the antenna 16 by a drive wheel 20 linked to move in synchronism with the motor 17. As a result, a predetermined length of tape 19 is advanced during each antenna rotation regardless of the rotational speed of the antenna.

In order to eliminate those pulse signals arriving at the receiver 14 which result from detection of the main pulse transmitted by the antenna system rather than from a reflected pulse, a conventional main pulse blanking unit 21 is employed. This unit is arranged in the usual manner to block signals received from the receiver 14 at times when the timer 11 actuates the transmitter 12 but to pass the signals from the receiver at all other times. Since the remaining signals, which represent only the pulses resulting from reflection of microwave radiation by other objects, are too short in duration to be recorded magnetically, they are applied to a pulse shaper 22 arranged in any well known manner to produce a pulse having a relatively long duration suitable for operating a magnetic transducer, for example, one millisecond, in response to each input pulse. As described more fully hereinafter, the duration of the pulses from the shaper 22 governs the resolution of the warning system, a one millisecond pulse producing a minimum resolution of about eleven minutes of arc for an antenna rotating once every two seconds. Accordingly, the pulse duration should be selected in conjunction with the rotation rate to produce the desired resolution.

Output signals from the pulse shaper are transmitted to a conventional transducer 23 arranged as a magnetic recording head and positioned in the recording unit 18 to impress the signals on the magnetic tape 19. Spaced along the tape from the recording head 23 in the direction of tape motion at intervals equal to the tape distance representing one antenna revolution are three reading heads 24, 25 and 26. The recording unit 18 also includes an erase head 27 of the usual type arranged to erase pulse signals from the tape after it has passed the three reading heads.

A conventional coincidence circuit 28, which may comprise an AND gate having three inputs, for example, receives signals from the three reading heads 24, 25 and 26. Simultaneous detection of signals by these heads generates an output signal which is transmitted to a bearing indicator 29 adapted to indicate the angular direction from which the three signals actuating the coincidence circuit were received by the antenna. To this end, the bearing indicator may comprise a cathode ray tube arranged for plan position indication in the same manner as the indicator 15 and similarly synchronized to rotate with the antenna 16. Therefore, inasmuch as the heads 23, 24, 25, and 26 are separated by distances equivalent to one antenna rotation, the bearing indicator produces an indication of the angular position of the antenna as each of three successive signals actuating the coincidence circuit were received.

Pulses from the coincidence circuit 28 are also applied to a conventional pulse counter 30 controlled in any well known manner by a reset timer 31 and adapted to actuate an alarm 32 after the counter has been raised to a selected count level. Each pulse applied to the counter from the coincidence circuit raises its level by one count but if no pulse is received within a selected period of time which is preferably slightly greater than the time required for one antenna revolution, the timer 31 resets the counter to zero. When a selected number of counts, such as three, for example, has been received by the counter without resetting, the counter energizes the alarm 32 automatically to warn that the vessel is on a collision course.

In operation, if another object is within range of the search radar, the antenna 16 receives a microwave return pulse during each rotation at the time when it is oriented toward that object. The pulse shaper 22, which receives these pulses, generates a pulse of selected duration in response to each return pulse and the output pulses are recorded on the magnetic tape 19 by the recordling head 23. If the ship is on a collision course with the object, the antenna receives the return pulse from the object when it is in the same angular position during each rotation so that the magnetic pulses are recorded on the tape at intervals equal to the spacing of the heads 24, 25, and 26. Consequently, when these pulses reach the reading heads, they actuate the coincidence circuit to transmit a pulse signal to the bearing indicator 29 and the counter 30.

When the antenna receives the next reflected pulse from the object, another magnetic pulse is recorded on the tape at the same distance behind the last pulse and the coincidence circuit is tripped again when the tape is moved a distance equal to one antenna rotation, thereby raising the counter 30 to the second count level, the reset timer being ineffective since the pulse was received within the required period. A further pulse at the same antenna position actuates the coincidence circuit a third time, setting off the alarm 32 if the counter is set to give a warning signal at the three count level, as described above.

Each of the pulses from the coincidence circuit also actuates the bearing indicator 29 to display an angular indication of the position of the object. If the ship is on a collision course with two or more objects, the indicator will show the bearing of each object and, in this event, the pulse counter will set off the alarm in a shorter time since two or more pulses are received by the counter during each antenna rotation.

Inasmuch as an object having a bearing which changes only slightly with each antenna rotation represents a collision risk, the duration of the pulses from the shaper 22 should be of sufficient length to trip the alarm in these circumstances. Thus, if the shaper output pulse duration is one millisecond, corresponding to an angle of resolution of about eleven minutes of arc with an antenna rotating once every two seconds, an object maintaining a bearing which changes by less than this angle during at least three successive rotation periods, or six seconds, will trip the alarm since the pulse records on the magnetic tape are sufficiently long to actuate the three reading heads at the same time. By the same token, the resolution of the system can be decreased to about twenty-two minutes of arc by utilizing a shaper which provides two millisecond output pulses.

Although the invention has been described herein with reference to a specific embodiment, many modifications and variations therein will readily occur to those skilled in the art. Accordingly, all such variations and modifications are included within the intended scope of the invention as defined by the following claims.

I claim:

1. A warning system for indicating when a vehicle is on a collision course with relation to another object comprising rotatable detecting means mounted on the vehicle, record means movable in synchronism with the detecting means, recording means for marking the record means in response to detection of an object by the detecting means, means for controlling the duration of the marks applied by the recording means so as to regulate the angular resolution of the system, and reading means including a plurality of reading devices adjacent to the record means spaced at intervals equivalent to one or more detector rotations to produce simultaneous output signals in response to detection of objects on a collision course with the vehicle.

2. A warning system for indicating when a vehicle is on a collision course with relation to another object comprising means adapted to detect objects in the area surrounding the vehicle including a rotatable antenna, a record medium movable in synchronism with the rotating antenna, recording means for marking the record medium in response to detection of an object by the detecting means, means for controlling the duration of the marks applied by the recording means so as to regulate the angular resolution of the system, reading means including a plurality of record reading devices adjacent to the record medium and spaced in its direction of motion at intervals equivalent to one antenna rotation, gate means responsive to simultaneous actuation of all of the reading devices by signals recorded on the medium, and warning means actuable in response to operation of the gate means.

3. A warning system for indicating when a vehicle is on a collision course with relation to another object comprising means adapted to detect objects in the area surrounding the vehicle including a rotatible antenna, a record medium movable in synchronism with the rotating antenna, recording means for marking the record medium in response to detection of an object by the detecting means, means for controlling the duration of the marks applied by the recording means so as to regulate the angular resolution of the system, reading means including a plurality of record reading devices adjacent to the record medium and spaced in its direction of motion at intervals equivalent to one antenna rotation, gate means responsive to simultaneous actuation of all of the reading devices by signals recorded on the medium, and warning means actuable in response to a selected number of successive operations of the gate means during successive antenna rotations.

4. A warning system for indicating when a vehicle is on a collision course with relation to another object comprising means adapted to detect objects in the area surrounding the vehicle including a rotatable antenan, a record medium movable in synchronism with the rotating antenna, recording means for marking the record medium in response to detection of an object by the detecting means, reading means including a plurality of record reading devices adjacent to the record medium and spaced in its direction of motion at intervals equivalent to one antenna rotation, gate means responsive to simultaneous actuation of all of the reading devices by signals recorded on the medium, counter means actuable in response to each operation of the gate means and arranged to set off a warning device at a selected count level, and timer means for resetting the counter means whenever the interval between actuations exceeds a selected value.

5. A system according to claim 4 wherein the timer means resets the counter means whenever the interval between actuations is greater than the time required for one antenna rotation.

6. A warning system for indicating when a vehicle is on a collision course with relation to another object comprising means adapted to detect objects in the area surrounding the vehicle including a rotatable antenna, a record medium movable in synchronism with the rotating antenna, recording means for marking the record medium in response to detection of an object by the detecting means, means for controlling the duration of the marks applied by the recording means so as to regulate the angular resolution of the system, reading means including a plurality of record reading devices adjacent to the record medium and spaced in its direction of motion at intervals equivalent to one antenna rotation, gate means responsive to simultaneous actuation of all of the reading devices by signals recorded on the medium, and bearing indicator means synchronized with the antenna rotation and responsive to a signal from the gate means to indicate the bearing of the object producing the corresponding signals on the record medium.

7. A warning system for indicating when a vehicle is on a collision course with relation to another object comprising means adapted to detect objects in the area surrounding the vehicle including a rotatable antenna, a record medium movable in synchronism with the rotating antenna, recording means for marking the record medium in response to detection of an object by the detecting means, reading means including a plurality of record reading devices adjacent to the record medium and spaced in its direction of motion at intervals equivalent to one antenna rotation, gate means responsive to simultaneous actuation of all of the reading devices by signals recorded on the medium, counter means actuable in response to each operation of the gate means and arranged to set off a warning device at a selected count level, timer means for resetting the counter means whenever the interval between actuation exceeds a selected value, and bearing indicator means synchronized with the antenna rotation and responsive to a signal from the gate means to indicate the bearing of the object producing the corresponding signals on the record medium.

8. A warning system for indicating when a vehicle is on a collision course with relation to another object comprising a radar system adapted to detect objects in the area surrounding the vehicle and including a rotatable antenna, an endless loop of magnetic tape movable in synchronism with the rotating antenna, a transducer responsive to detection of an object by the radar system to record a pulse on the tape, a plurality of reading heads adjacent to the tape and spaced from the transducer in the direction of tape motion at intervals equal to one antenna rotation, a coincidence circuit responsive to simultaneous detection of magnetic pulses by all the reading heads, a counter adapted to be advanced by each actuation of the coincidence circuit, and arranged to operate an alarm at a selected count level, and a reset timer adapted to reset the counter whenever the interval between actuations exceeds a selected value.

9. A warning system according to claim 8 having three reading heads adjacent to the tape.

10. A warning system according to claim 8 wherein the reset timer resets the counter whenever the interval between actuation is greater than the time required for one antenna rotation.

References Cited in the file of this patent

UNITED STATES PATENTS

| | | |
|---|---|---|
| 2,410,424 | Brown | Nov. 5, 1946 |
| 2,717,999 | Lewinstein | Sept. 13, 1955 |
| 2,836,359 | Mazzagatti | May 27, 1958 |
| 2,957,082 | Plass | Oct. 18, 1960 |
| 3,095,560 | Castellini | June 25, 1963 |